United States Patent [19]

Yoshihara et al.

[11] 4,115,415
[45] Sep. 19, 1978

[54] PROCESS FOR THE PRODUCTION OF ALKYLENE GLYCOL ETHER ESTER OF ORGANIC CARBOXYLIC ACID

[75] Inventors: Hiroshi Yoshihara, Yokkaichi; Takashi Tobita, Ichihara; Ryoichi Tomizawa, Ichihara; Kunio Ishikawa, Chiba, all of Japan

[73] Assignee: Nisso Petrochemical Industries Co., Ltd., Tokyo, Japan

[21] Appl. No.: 734,717

[22] Filed: Oct. 22, 1976

Related U.S. Application Data

[63] Continuation-in-part of Ser. No. 524,156, Nov. 15, 1974, Pat. No. 4,022,808.

[30] Foreign Application Priority Data

Nov. 19, 1973 [JP] Japan .................. 48/129937
Nov. 19, 1973 [JP] Japan .................. 48/129938
Nov. 6, 1974 [JP] Japan .................. 49/127052

[51] Int. Cl.$^2$ ........................... C09F 5/08; C11C 3/00
[52] U.S. Cl. ........................... 260/410; 260/410.6; 560/91; 560/92; 560/93; 560/190; 560/200; 560/234; 560/260
[58] Field of Search .................. 260/410, 410.6, 491, 260/476 R, 496, 468 R, 485 R, 486 R, 475 R; 560/234, 91, 92, 93, 190, 200, 260

[56] References Cited

U.S. PATENT DOCUMENTS

| 2,476,052 | 7/1949 | Lippincott | 560/234 |
| 2,481,278 | 9/1949 | Ballard et al. | 260/410.6 X |
| 3,255,236 | 6/1966 | Selwitz et al. | 260/491 |
| 3,629,325 | 12/1971 | Tomomatsu | 562/234 |
| 3,700,726 | 10/1972 | Johnson et al. | 269/491 |

Primary Examiner—Winston A. Douglas
Assistant Examiner—John F. Niebling
Attorney, Agent, or Firm—George B. Oujevolk

[57] ABSTRACT

A process for the production of an alkylene glycol ether ester of an organic carboxylic acid which comprises the step of reacting an alkylene oxide with an ester of organic carboxylic acid in accordance with the following reaction equation:

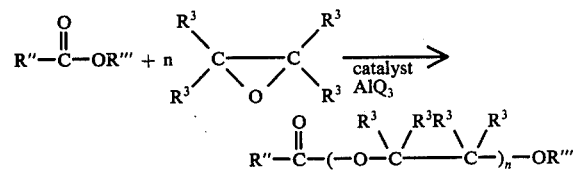

wherein

R" is a substituted or non-substituted hydrocarbon having 1 to 20 carbon atoms or a hydrogen atom;

R'" is a substituted or non-substituted hydrocarbon having 1 to 20 carbon atoms;

$R^3$ are each the same or different substituted or non-substituted hydrocarbon having 1 to 10 carbon atoms or a hydrogen atom;

Q is simultaneously the same or different groups X, R, OR, SR, $NR_2$ or $PR_2$ (wherein X is a halogen atom selected from the group consisting of Cl, Br, and I, and R is the same or different substituted or non-substituted hydrocarbon having 1 to 20 carbon atoms or a hydrogen atom, and a combination of all Q=R does not occur).

1 Claim, No Drawings

PROCESS FOR THE PRODUCTION OF ALKYLENE GLYCOL ETHER ESTER OF ORGANIC CARBOXYLIC ACID

This application is a continuation-in-part of U.S. patent application Ser. No. 524,156, filed Nov. 15, 1974, now U.S. Pat. No. 4,022,808.

DETAILED EXPLANATION OF THE INVENTION

This invention relates to a novel process for production of alkylene glycol ether ester of organic carboxylic acid, and more particularly relates to a novel process for the production of a mono or poly-alkylene glycol ether ester of organic carboxylic acid from organic carboxylic acid ester and alkylene oxide by the direct reaction of alkylene oxide with an organic carboxylic acid ester.

It is known that alkylene glycol ether ester can not be produced by the direct reaction of alkylene oxide and organic carboxylic acid ester. So, alkylene glycol ether ester of organic carboxylic acid is produced by esterification of alkylene glycol mono-alkyl ether with organic carboxylic acid, or is produced by ester exchange reaction between ester of organic carboxylic acid and alkylene glycol mono-alkyl ether. As an improved process of these two step reactions, Japanese Patent Publication No. SHO45-20286 describes a process in which the additional reaction of alkylene oxide and ester exchange reaction takes place by adding alkylene oxide into a mixture of ester of organic carboxylic acid and alcohol. However, in the process it takes a long time to complete the reaction and the separation of the subject material is very troublesome.

Accordingly, it is an object of the present invention to provide a process in which alkylene glycol ether ester of organic carboxylic acid is produced in a one step reaction from an ester of an organic carboxylic acid and an alkylene oxide.

It is a further object of the invention to provide a process in which alkylene glycol ether ester of an organic carboxylic acid is produced in high yield.

It is also an object of the invention to provide a process in which an alkylene glycol ether ester of the organic carboxylic acid can be easily separated from the reaction mixture.

We have found that some compounds containing Al provide a catalytic action for the addition reaction of alkylene oxide to ester of organic carboxylic acid.

In the invention, for the preparation of alkylene glycol ether ester of organic carboxylic acid, alkylene oxide is reacted with an ester of organic carboxylic acid at about 50°–300° C. using at least a catalyst selected from halogenated metallic compounds or organometallic compounds of aluminum (Al), except for trialkyl aluminum).

The reaction of alkylene oxide and ester of organic carboxylic acid is shown as follows and poly or mono-alkylene glycol ether ester of organic carboxylic acid is obtained.

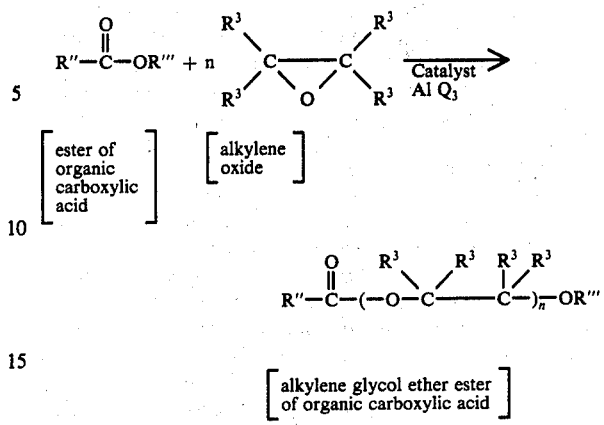

Wherein, the component Q of the above formula will be explained herein and R" represents simultaneously the same or different groups of substituted or non-substituted hydrocarbon group or groups having 1 to 20 carbon atoms or a hydrogen atom, R'" represents simultaneously the same or different groups of substituted or non-substituted hydrocaron or hydrocarbons having 1 to 20 carbon atoms, $R^3$ represents simultaneously the same or different groups of substituted or non-substituted hydrocarbon or hydrocarbons having 1 to 10 carbon atoms or a hydrogen atom.

In the invention various kinds of alkylene oxide can be used. As the most popular alkylene oxide, for example, one or more of the following: ethylene oxide, propylene oxide, iso-butylene oxide, 1,2-butylene oxide, 2,3-butylene oxide, styrene oxide are employed and the corresponding alkylene glycol ether ester of organic carboxylic acid is obtained.

As an ester of organic carboxylic acid in the invention, various kind of organic carboxylic acid can be employed and ordinarily it is preferable when R" and R'" represent simultaneously the same or different groups of alkyl, cycloalkyl, allyl, aryl and arylalkyl components.

Typical example of ester of organic carboxylic acid are listed as follows: methyl formate, ethyl formate, proply formate, amyl formate, octyl formate, decyl formate, dodecyl formate, tetradecyl formate, hexadecyl formate, octadecyl formate, methyl acetate, ethyl acetate, vinyl acetate, propyl acetate, isopropyl acetate, butyl acetate, hexyl acetate, octyl acetate, decyl acetate, undecyl acetate, tridecyl acetate, pentadecyl acetate, heptadecyl acetate, methyl propionate, ethyl propionate, propyl propionate, decyl propionate, amyl butylate, heptyl butylate, decyl butylate, butyl valerate, hexyl valerate, octyl valerate, ethyl cyclopentane carboxylate, methyl caproate, ethyl caproate, vinyl caproate, propyl caproate allyl caproate, butyl caproate, octyl caproate, dodecyl caproate, pentadecyl caproate, ethyl cyclohexanecarboxylate, methyl enanthoate, butyl enanthoate, octyl enanthoate, methyl benzoate, ethyl benzoate, isopropyl benzoate, n-butyl benzoate, isobutyl benzoate, isoamyl benzoate, phenyl benzoate, methyl caprylate, propyl caprylate, amyl caprylate, heptyl caprylate, ethyl pelargonate, vinyl pelargonate, methyl caprate, vinyl caprate, isopropyl caprate, heptyl caprate, methyl laurate, ethyl laurate, vinyl laurate, propyl laurate, octyl laurate, dodecyllaurate, octadecyl laurate, ethyl myristate, butyl myristate, methyl palmitate, ethyl palmitate, amyl palmitate, ethyl stearate, octyl stearate, hexadecyl stearate, methyl oleate, ethyl oleate, propyl oleate, isopropyl oleate, isobutyl oleate, isoamyl oleate, oleyl oleate, methyl ricinoleate, ethyl ricinoleate, propyl ricinoleate, heptyl ricinoleate.

Further, an ester of organic carboxylic acid having R''' which is alkyl group substituted with a hydroxyl group or hydroxyl alkoxyl group can be employed. For example, esters which are produced with esterification of organic carboxylic acid, such as formic acid, acetic acid, propionic acid, butyric acid, valeric acid, caproic acid, cyclohexyl carboxylic acid, enanthic acid, benzoic acid, caprylic acid, pelargonic acid, capric acid, lauric acid, tridecyl carboxylic acid, palmitic acid, stearic acid, oleic acid, ricinoleic acid, and poly-hydroxyl alkylene or polyalkylene glycol such as ethylene glycol, propylene glycol, butylene glycol, hexylene glycol, glycerine, pentaerythritol, sorbitol, can be listed. Furthermore such esters of dicarboxylic acid such as oxalic acid, citric acid, terephthaic acid may be employed.

As catalysts, halogenated-aluminum or organoaluminum compounds which have a carbon atom bonding with an aluminum atom directly or through an intermediating atom of oxygen, sulfur, nitrogen or phosphorus can be used. Typical compounds of halogenated-aluminum or organoaluminum compounds can be represented by a formula (1) Al $Q_3$, wherein Q is simultaneously the same or different groups of halogen atoms, R, OR, SR, $NR_2$ and $PR_2$, (in which R represents the same or different hydrocarbon group having 1–20 carbon atoms and having or not having substituted groups, or hydrogen atom, and a combination of three Q = R does not occur.) Particularly chlorine, bromine, iodine or fluorine is preferable as the halogen atom. As a group of R, alkyl, cycloalkyl, allyl aryl or arylalkyl, such as, methyl, ethyl, vinyl, propyl, isopropyl, butyl, isobutyl, hexyl, octyl, decyl, stearyl, phenyl, naphthyl, benzyl, toluyl, cyclopentyl, cyclohexyl, cyclopentadiphenyl or derivatives thereof are chosen.

The following are typical examples of aluminum compounds; aluminum chloride, aluminum iodide, aluminum fluoride, aluminum bromide, (Q is halogen and R) methyl aluminum dichloride, ethyl aluminum dichloride, isobutyl aluminum dichloride, ethyl aluminum dibromide, allyl aluminum dichloride, vinyl aluminum dichloride, methyl aluminum sesquichloride, ethyl aluminum sesquichloride, methyl aluminum sesquibromide, ethyl aluminum sesquiiodide, isobutyl aluminum sesquichloride, hexyl aluminum sesquichloride, cyclohexyl aluminum sesquichloride, phenyl aluminum dichloride, phenyl aluminum dibromide, dimethyl aluminum bromide, diethyl aluminum chloride, diethyl aluminum bromide, diethyl aluminum iodide, diisobutyl aluminum chloride, ethylphenyl aluminum chloride, dodecyl aluminum chloride, diphenyl aluminum chloride, (Q is OR) tri-methoxy aluminum, triethoxy aluminum, triisopropoxy aluminum, tri-butoxy aluminum, (Q is $NR_2$) tri(ethyl-amino) aluminum, tri(diethyl-amino) aluminum, tri(isopropylamino) aluminum, tri(diisopropylamino) aluminum, tri(butylamino) aluminum, tri(dibutylamino) aluminum, tri (hexylamino) aluminum, tri(cyclohexylamino) aluminum, trianilino aluminum, tri(N-ethylanilino) aluminum, (Q is SR) aluminum trimethylmercaptide, aluminum triethylmercaptide, aluminum tripropylmercaptide, aluminum tributylmercaptide, aluminum triphenylmercaptide, (Q is $PR_2$) aluminum trimethylphosphide, aluminum triethylphosphide, aluminum tri(isopropyl-phosphide), aluminum tri(butylphosphide), aluminum tri(benzylphosphide), aluminum tri (phenylphosphide), aluminum tri(diethylphosphide), aluminum tri (methylphenylphosphide), (Q is halogen and OR) methoxy aluminum dichloride, ethoxy aluminum dichloride, ethoxy aluminum dibromide, isopropoxy aluminum dichloride, butoxy aluminum dichloride, phenoxy aluminum dichloride, dimethoxy aluminum chloride, diethoxy aluminum chloride, diethoxy aluminum bromide, diphenoxy aluminum chloride, (Q is R and OR) methoxydimethyl aluminum, ethoxy diethyl aluminum, phenoxy diethyl aluminum, isopropoxydiethyl aluminum, methoxy diisobutyl aluminum, ethyldiethoxy aluminum, ethyldiphenoxy aluminum, isobutyldiethoxy aluminum, (Q is halogen and SR) methylmercapto aluminum dichloride, ethylmercapto aluminum dichloride, ethylmercapto aluminum dibromide, isopropylmercapto aluminum dichloride, phenylmercapto aluminum dichloride, diethylmercapto aluminum chloride, diethylmercapto aluminum bromide, diisobutylmercapto aluminum chloride, diphenylmercapto aluminum chloride (Q is R and SR) diethyl aluminum methylmercaptide, diethyl aluminum ethylmercaptide, diethyl aluminum isobutylmercaptide, diethyl aluminum cyclohexyl mercaptide, diethyl aluminum phenylmercaptide, diethyl aluminum laurylmercaptide, ethyl aluminum diethylmercaptide, ethyl aluminum diphenylmercaptide (Q is halogen and $NR_2$) methylamino aluminum dichloride, dimethylamino aluminum dichloride, ethylamino aluminum dichloride, ethylamino aluminum dichloride, diethylamino aluminum dibromide, isopropylamino aluminum dichloride, cyclohexyl amine aluminum chloride, laurylamino aluminum dichloride, anilino aluminum dichloride, N-ethylanilino aluminum dichloride, benzylamino aluminum dichloride, toluylamino aluminum dichloride, bis(dimethylamino) aluminum chloride, bis(diethylamino) aluminum chloride, dianilino aluminum chloride, (Q is R and $NR_2$) diethyl aluminum methylamide, diethyl aluminum ethylamide, diethyl aluminum butylamide, diethylaluminum cyclohexylamide, diethyl aluminum phenylamide, diethyl aluminum laurylamide, diethyl aluminum benzylamide, diethyl aluminum diethyl amide, diethyl aluminum diphenylamide, ethyl aluminum bis(diethylamide), ethyl aluminum bis(N-methyltoluylamide) (Q is halogen and $PR_2$) methylphosphino aluminum dichloride, ethylphosphino aluminum chloride, butylphosphino aluminum dichloride, cyclohexylphosphino aluminum dichloride, dimethylphosphino aluminum dibromide, diethylphosphino aluminum dibromide, phosphino aluminum dichloride, phenylphosphino aluminum dichloride, methylphenylphosphino aluminum dichloride, dimethylphosphino aluminum chloride, diethylphosphino aluminum chloride, dibutylphosphino aluminum chloride, diphenylphosphino aluminum chloride (These organoaluminum halogenide can be prepared by reacting the corresponding alcohol, mercaptan (these, amine or phosphine with alkyl aluminum halogenide by a known process.) (Q is R and $PR_2$) diethyl aluminum methylphosphide, diethyl aluminum ethylphosphide, diethyl aluminum butylphosphide, diethyl aluminum cyclohexyphosphide, diethyl aluminum diethylphosphide, diethyl aluminum dibutylphosphide, diethyl aluminum phenylphosphide, ethyl aluminum diethylphosphide, ethyl aluminum diphenylphosphide, ethyl aluminum bis(diethylphosphide), ethyl aluminum bis(diphenylphosphide). (These organo aluminum compound can be prepared by reacting the corresponding alcohol, mercaptan, amine or phosphine with trialkyl aluminum) (Q is OR and SR, OR and $NR_2$, OR and $PR_2$, NR$_2$ and PR$_2$, and SR and PR$_2$) ethoxy aluminum diethylmercaptide, diethoxy aluminum ethylmercaptide ethoxy aluminum bis(diethylamide), diethoxy aluminum diethylamide, ethoxy aluminum bis(diphenyl-phosphide), diethoxy aluminum diphenyl phosphide, bis(-diethlamino) aluminum ethylmercaptide, diethylamino aluminum diethylmercaptide, bis(diethylamino) aluminum diphenylphosphide, diethylamino aluminum bis(diphenylphosphide), diethylmercapto aluminum diphenylphosphide, ethylmercapto aluminum bis(diphenylphosphide) (These compounds can be prepared by reacting the corresponding alcohol, mercaptan, amine and phosphine with alkyl aluminum alkoxide, alkyl aluminum mercaptide, alkyl aluminum amide or alkyl aluminum phosphide). As organoaluminum halogenide, Q may be selected as follows; halogen, R and OR, halogen, R and SR, halogen, R and NR$_2$, halogen, R and PR$_2$, halogen, OR and NR$_2$, halogen, OR and SR, halogen, OR and PR$_2$, halogen, SR and NR$_2$, halogen, NR and PR$_2$ and halogen, SR and PR$_2$ and typical examples are as follows methylethoxy aluminum chloride, ethylisopropoxy aluminum chloride, ethylphenoxy aluminum chloride, ethylmercapto aluminum chloride, ethylmercapto aluminum chloride, ethyldiethylamino aluminum chloride, ethyldiphenylamino aluminum chloride, ethyldiethylphosphino aluminum chloride, ethyldi-phenylphosphino aluminum chloride, ethoxydiethylamino aluminum chloride, ethoxyphenylmercapto aluminum chloride, ethoxyphenylphosphino aluminum chloride, ethyl mercaptodiethylamino aluminum chloride, diethlamino diphenylmercapto aluminum chloride, ethylmercaptodiphenylphosphino aluminum chloride. (These compounds can be prepared by reacting the corresponding alcohol, mercaptan, amine and phosphine with alkyl aluminum halogenide by a known process.) Further Q can be selected as follows, R, OR, and NR$_2$, R, OR and SR, R, OR and PR$_2$, R, NR$_2$ and SR, R, NR and PR$_2$, P, SR and PR$_2$, OR, NR$_2$ and SR, OR, NR$_2$ and PR$_2$, OR, SR and PR$_2$, NR$_2$, SR and PR$_2$, and typical examples are as follows; ethylethoxy aluminum diethylamide ethylethoxy aluminum diphenylphosphide, ethyldiethylamino aluminum diphenyl phosphide and these compound can be prepared from trialkyl aluminum according to a known process. Among the compounds used as a catalyst, aluminum compounds having aluminum-oxygen, aluminum-halogen, aluminum-nitrogen or aluminum-phosphorus combination are preferably employed and more preferably aluminum compound having an aluminum-halogen, aluminum-nitrogen or aluminum-phosphorus combination are employed.

In the group of compounds shown by formula (1), the aluminum compound having halogen-aluminum, oxygen-aluminum, sulfur-aluminum, nitrogen-aluminum or phosphorus-aluminum bond, have an excellent catalytic effect when used without adding any cocatalyst.

The employable amount of catalyst is not limited, however ordinarily 0.01–20 weight %, preferably 0.1–5 weight % of basic catalyst to ester of organic carboxylic acid is employed.

In practice, the basic catalyst is directly or indirectly employed in the reaction.

In using the catalyst, the catalyst can be added without any carrier or with a solid carrier such as a-alumina and the reaction of alkylene oxide with ester or organic carboxylic acid can be carried out in the liquid phase in a continuous or batch system. In an even batch system, the required amount of alkylene oxide can be added all at a time or intermittently.

The mole ratio of alkylene oxide and the ester of organic carboxylic is not limited and when a small mole number of alkylene oxide to be added to the ester of organic carboxylic acid is required, a small mole number of alkylene oxide is employed and when a large mole number of alkylene oxide is required, a high mole number of alkylene oxide is employed.

When a large amount of alkylene oxide is added to an ester of organic carboxylic acid, the alkylene oxide is preferably added intermittently in order to avoid vigorous exothermic reaction. The reaction temperature is ordinarlily 50° C.~300° C., preferably 120° C.~200° C. and the reaction can be carried out at an increased pressure or at vapor pressure at the reaction temperature. Ordinarily less than 50 kg/cm$^2$ is employed and in a batch system the pressure drops according to the progress of the reaction and the pressure becomes constant when the reaction is completed.

After the reaction is completed, if desired the catalyst is decomposed with water, products can be refined by distillation of the reaction mixture. When the catalyst is solid in the reaction mixture, the reaction mixture is preferably filtered and then distillated to obtain the product and when the catalyst is dissolved in the reaction mixture, the reaction mixture is preferably distillated without filtration. Catalyst can be recycled if the reaction is carried out in appropriate atmosphere.

In this invention glycolether is not substantially produced and alkylene glycol ether ester of organic carboxylic acid is produced in high yield.

EXAMPLE 1

Dried ethyl acetate, ethylene oxide and catalysts were fed in a dried stainless steel autoclave having a magnetic stirrer according to Table 1.

Raw material and catalyst were treated under dry nitrogen gas. Reaction was started at less that 15 kg/cm$^2$ and was stopped when pressure attained equilibrium. The reaction mixture was filtered, unreacted ethyl acetate was recovered by distillation under atmospheric pressure and then the mixture was distilled under a reduced pressure to obtain desired product.

The results are listed in Table 1, in which EO-1, EO-2 and EO-3 respectively show ethyleneglycol ethylether acetate, diethyleneglycol ethylether acetate and polyethyleneglycol ethylether acetate higher than diethyleneglycol ethylether acetate.

EXAMPLES 22, 31 AND 37

Dried ethyl acetate, ethylene oxide and catalyst were fed in a dried stainless steel autoclave shown in example 1 according to Table 1.

Reaction was carried out at 160° C. under dry nitrogen atmosphere. After pressure attained equilibrium the autoclave was cooled and about 90% of water to enough amount of water to decompose all catalyst was added in the reaction mixture. Precipitation of aluminum hydroxide or titanium hydroxide was filtered off, unreacted ethyl acetate was distilled off and desired product was obtained by distillation under reduced pressure.

The results are listed in Table 1, in which EO-1, EO-2 and EO-3 respectively show ethyleneglycol ethylether acetate, diethyleneglycol ethylether acetate and polyethyleneglycol ethylether acetate higher than diethyleneglycol ethylether acetate.

EXAMPLES 70, 73, 77, 80, 82, 83, 85 AND 90

In an autoclave shown in example 1, 160 g of dried ethyl acetate, 20 g of ethylene oxide and catalyst were fed at 160° C. for a period shown in Table 2. Basic catalysts (C) was prepared from aluminum compound (A) and compound (B) as shown in Table 2 according to known method. Raw material and catalyst were treated under dry nitrogen gas. After pressure of the autoclave attained equilibrium the autoclave was cooled to room temperature, unreacted ethyl acetate was distilled off at atmospheric pressure without decomposing catalyst and then the desired product was distilled under reduced pressure. The product obtained was analyzed by gas-chromatography.

The results are shown in Table 2, in which EO-1, EO-2 and EO-3 respectively show ethyleneglycol ethylether acetate, diethyleneglycol ethylether acetate and polyethyleneglycol ethylether acetate higher than diethyleneglycol ethylether acetate.

Table 1

| Example No. | Raw material Ester of organic carboxylic acid (ethyl acetate) | Alkylene oxide (ethylene oxide) | Catalyst (g) | | Reaction condition Temp. (°C) | Time (Hr.) | Reaction mixture (g) | | |
|---|---|---|---|---|---|---|---|---|---|
| | | | | | | | EO-1 | EO-2 | EO-3 |
| 1 | 170 | 17 | AlCl$_3$ | 1.14 | 160 | 6.0 | 13.2 | 3.1 | 6.7 |
| 22 | 170 | 17 | Al(OEt)$_3$ | 1.30 | 160 | 6.0 | 15.1 | 3.7 | 6.0 |
| 31 | 170 | 17 | Al(O-iPr)$_3$ | 1.63 | 160 | 6.0 | 18.0 | 4.0 | 6.0 |
| 37 | 160 | 20 | Et$_2$AlCl | 1.21 | 160 | 2.5 | 25.6 | 6.2 | 4.3 |

Table 2

| Example No. | Catalyst (g) | | | | Reaction condition | | Reaction products (g) | | |
|---|---|---|---|---|---|---|---|---|---|
| | A | B | C | | Temp.(°C) | Time(Hr) | EO-1 | EO-2 | EO-3 |
| 70 | Et$_2$AlCl | ethanol | (EtO)$_2$AlCl | 1.5 | 160 | 2.0 | 27.3 | 8.6 | 6.2 |
| 73 | Et$_2$AlCl | phenylphosphine | [H−P(C$_6$H$_5$)]$_2$AlCl | 2.8 | 160 | 1.0 | 29.7 | 10.1 | 4.5 |
| 77 | AlEt$_3$ | diethylamine | Et$_2$Al(NEt$_2$) | 1.6 | 160 | 0.6 | 29.1 | 11.0 | 6.0 |
| 80 | AlEt$_3$ | diphenylphosphine | (C$_6$H$_5$)$_2$PAlEt$_2$ | 1.9 | 160 | 1.5 | 29.9 | 10.2 | 9.4 |
| 82 | EtAl(OEt)$_2$ | diethylamine | Et$_2$NAl(OEt)$_2$ | 1.9 | 160 | 1.0 | 28.7 | 9.1 | 10.3 |
| 83 | EtAl(OEt)$_2$ | phenylphosphine | H(C$_6$H$_5$)PAl(OEt)$_2$ | 2.3 | 160 | 1.5 | 28.9 | 9.4 | 6.3 |
| 85 | Et$_2$Al(OEt) | diethylamine | EtAl(OEt)(NEt$_2$) | 1.7 | 160 | 2.0 | 28.4 | 9.1 | 9.7 |
| 90 | AlEt$_3$ | morpholine | EtAl(N○O)$_2$ | 2.1 | 160 | 1.5 | 28.3 | 9.3 | 6.5 |

We claim:

1. A process for the production of an alkylene glycol mono alkyl ester of an organic acid having the general formula selected from the group consisting of:

$$R''-\overset{O}{\underset{\|}{C}}-(O-\overset{R^3}{\underset{R^3}{C}}-\overset{R^3}{\underset{R^3}{C}})_n-OR''',$$

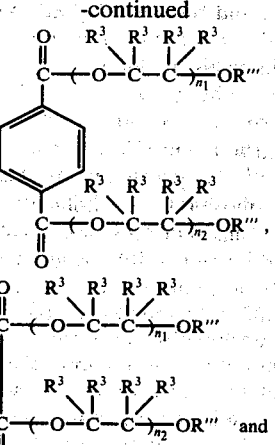

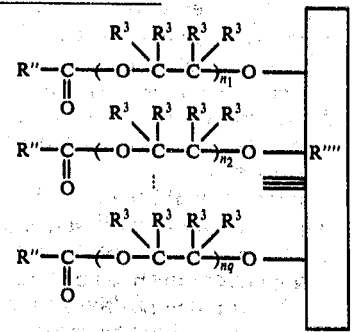

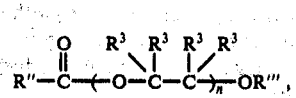

which comprises the step of reacting an alkylene oxide having a general formula $$\begin{array}{c} R^3 \\ \diagdown \\ R^3 \end{array} C \underset{O}{\diagup\diagdown} C \begin{array}{c} R^3 \\ \diagup \\ R^3 \end{array}$$

with an ester of an organic carboxylic acid having the general formula selected from the group consisting of $$R''-\underset{O}{\overset{O}{\|}}C-OR''', \quad \underset{O}{\overset{O}{\|}}C-OR''' \quad \underset{\underset{\|}{C}-OR'''}{\overset{O}{\|}}C-OR''' \text{ and } (R''-\underset{\|}{\overset{O}{C}}-O)_q-R'''$$

(with a benzene ring bearing two $\underset{O}{\overset{O}{\|}}C-OR'''$ groups)

in the presence of from 0.1 to 5 weight percent of a catalyst having the general formula selected from the group consisting of $R_mAlCl_{3-m}$, $(RO)_mAlCl_{3-m}$, $(RO)_mAlCl_{3-m}$, $R_mAl(NR_2)_{3-m}$,
$R_mAl(PR_2)_{3-m}$, $(RO)_mAl(NR_2)_{3-m}$, $(RO)_mAl(PR_2)_{3-m}$ $RAl(OR)(NR_2)$, $R_mAl(N\smile O)_{3-m}$, $(NR_2)_mAlCl_{3-m}$, $ClAlR(NR_2)$, $ClAl(OR)(NR_2)$, $RAlCl(N\smile O)$, and $ClAl(OR)(N\smile O)$ based on the weight of the ester of organic carboxylic acid, wherein R'' is an unsubstituted hydrocarbon having 1 to 20 carbon atoms or a hydrogen atom;
$R^3$ is an unsubstituted hydrocarbon having 1 to 10 carbon atoms or a hydrogen atom;
$n, n_1, n_2, \ldots n_q$ are positive integer; $m$ is 1 or 2;
R''' is an unsubstituted hydrocarbon having 1 to 20 carbon atoms;
R'''' is a hydrocarbon selected from the group consisting of $$\begin{array}{l} -CH_2 \\ | \\ -CH_2, \end{array} \quad \begin{array}{l} -CH_2 \\ | \\ -CH-CH_3, \end{array} \quad \begin{array}{l} -CH_2 \\ | \\ CH_2 \\ | \\ -CH_2, \end{array} \quad \begin{array}{l} -CH_2 \\ | \\ CH_2 \\ | \\ CH_2 \\ | \\ -CH_2, \end{array} \quad \begin{array}{l} -CH_2 \\ | \\ CH_2 \\ | \\ CH_2 \\ | \\ CH_2 \\ | \\ -CH_2, \end{array}$$

$$\begin{array}{c} -CH_2 \\ -CH_2 \diagdown \\ \phantom{-CH_2} C \\ -CH_2 \diagup \\ -CH_2 \end{array} \text{ and } \begin{array}{c} -CH_2 \\ | \\ -CH \\ | \\ -CH \\ | \\ -CH \\ | \\ -CH \\ | \\ -CH_2 \end{array};$$

and R is the same or different unsubstituted hydrocarbon having 1 to 20 carbon atoms or a hydrogen atom.

* * * * *